United States Patent
Nagahata et al.

(10) Patent No.: US 6,456,795 B1
(45) Date of Patent: Sep. 24, 2002

(54) CAMERA WITH A DISPLAY DEVICE AND OPERATION KEYS

(75) Inventors: Junko Nagahata, Osaka; Hiroshi Ueda, Habikino; Akihiko Fujino, Sakai; Rika Noguchi, Nishinomiya; Tatsuya Suzuki, Kawachinagano, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/931,872

(22) Filed: Aug. 20, 2001

(30) Foreign Application Priority Data

Aug. 23, 2000 (JP) ......................................... 2000-252359

(51) Int. Cl.⁷ .......................... G03B 7/08; G03B 13/36; G03B 17/24
(52) U.S. Cl. ....................... 396/121; 396/130; 396/147; 396/224; 396/234; 396/299
(58) Field of Search ................................. 396/130, 121, 396/122, 123, 147, 233, 234, 297, 299, 224

(56) References Cited

U.S. PATENT DOCUMENTS

| | | | |
|---|---|---|---|
| 5,625,848 A | 4/1997 | Imanari | ........................ 396/50 |
| 5,659,814 A * | 8/1997 | Matsukawa et al. | ........ 396/121 |
| 5,682,559 A * | 10/1997 | Yoshino et al. | ............. 396/121 |
| 5,832,323 A | 11/1998 | Goto | .......................... 396/297 |
| 6,374,056 B1 * | 4/2000 | Umetsu et al. | ............. 396/299 |

FOREIGN PATENT DOCUMENTS

| | | | |
|---|---|---|---|
| JP | 10-142650 | 5/1998 | ............ G03B/7/00 |
| JP | 10-148751 | 6/1998 | ............ G02B/7/28 |
| JP | 11-331667 | 11/1999 | .......... H04N/5/225 |

* cited by examiner

Primary Examiner—W. B. Perkey
(74) Attorney, Agent, or Firm—Morrison & Foerster LLP

(57) ABSTRACT

In a multifunction camera, an area selector is used both as an operation key in a first selection mode for selecting the focus detection area of the focus detection device, and as an operation key in a second selection mode for selecting the function setting of the camera. A mode selector is provided which is settable at three positions including a local position, wide position, and lock position. The focus detection area selected at the local position is locked when the mode selector is set at the lock position and has been moved from the local position to the lock position, whereas the wide position is locked when the mode selector has been moved from the wide position to the lock position.

10 Claims, 10 Drawing Sheets

| DEPRESSED POSITION | SWITHCH WHICH IS TURNED ON | | | | AF AREA TO BE SELECTED |
|---|---|---|---|---|---|
| | UP SWITCH | RIGHT SWITCH | DOWN SWITCH | LEFT SWITCH | |
| A | O | | | | 4 |
| B | O | O | | | 1 |
| C | | O | | | 2 |
| D | | O | O | | 3 |
| E | | | O | | 6 |
| F | | | O | O | 9 |
| G | | | | O | 8 |
| H | O | | | O | 7 |
| AF | — | — | — | — | 5 |

Fig. 7

| DEPRESSED POSITION | SWITHCH WHICH IS TURNED ON | | | | CURSOR MOVING DIRECTION |
| --- | --- | --- | --- | --- | --- |
| | UP SWITCH | RIGHT SWITCH | DOWN SWITCH | LEFT SWITCH | |
| A | O | | | | UP |
| B | O | O | | | RIGHT |
| C | | O | | | RIGHT |
| D | | O | O | | RIGHT |
| E | | | O | | DOWN |
| F | | | O | O | LEFT |
| G | | | | O | LEFT |
| H | O | | | O | LEFT |

Fig. 10

CAMERA WITH A DISPLAY DEVICE AND OPERATION KEYS

RELATED APPLICATION

This application is based on Application No. 2000-252359 filed in Japan, the content of which is hereby incorporated by reference.

TECHNICAL FIELD OF THE INVENTION

The present invention relates to a camera provided with an operation member, and in particular, to a camera with a display device and operation keys.

BACKGROUND OF THE INVENTION

In a camera with a multi-point autofocus function having a plurality of focus detection areas within a photographic picture, area selection by using conventional methods (such as a push switch SW and dial in conjunction with multi-points of the focus detection areas) are disadvantageous. On the other hand, much information can be displayed using a dot matrix or the like on an LCD display device.

SUMMARY OF THE INVENTION

In one embodiment of the invention, there is a camera. The camera includes a multi-point focus detection device having a plurality of focus detection areas; a display device to display information relating to the camera; and an area selector to control an ON/OFF state of switches arranged at least at four locations. The area selector is used to select one of the focus detection areas of the multi-point focus detection device, which area is displayed on the display device in a first selection mode, and is used to select setting items displayed on the display device in a second selection mode to select function settings of the camera.

In one aspect of the invention, in the first selection mode, one of the focus detection areas is selected which is positioned in an inclined direction relative to the currently selected focus detection area by simultaneously operating two adjacent area selectors among the four switches, and in the second selection mode, the setting item moves right or left and movement in an inclined direction is prohibited when two adjacent area selectors are simultaneously operated among the four switches.

In another embodiment of the invention, a multi-point focus detection device has a plurality of focus detection areas and mode selectors to select the focus detection mode. The mode selector has three position settings including a local position, wide position, and lock position. When the mode selector is set at the local position, the local mode is set wherein one area is optionally user selectable from among the plurality of focus detection areas. When the mode selector is set at the wide position, the wide mode is selected wherein one area is automatically selected by the camera from among the plurality of focus detection areas. When the mode selector is set at the lock position, the focus detection area selected at the local position is locked when the mode selector is moved from the local position to the lock position, and the wide mode is locked when the mode selector is moved from the wide position to the lock position.

In one aspect of the invention, the mode selector is a rotary type set at either a local position, wide position, or lock position, and the lock position is between the local position and the wide position.

In another aspect of the invention, the mode selector is a slide type set at either a local position, wide position, or lock position, and the lock position is between the local position and the wide position.

In still another aspect of the invention, the camera has a mode selector settable at three positions. A first position to select an automatic setting mode to automatically set the photographic conditions of the camera. A second position to select a manual setting mode for manually setting the photographic conditions of the camera. In third position, the mode selector is set at the third position, the automatic setting is fixed when the mode selector is moved from the first position to the third position, and the photographic conditions set by the second position are fixed when the mode selector is moved from the second position to the third position.

In yet another aspect of the invention, the mode selector is a rotary type set at either a first position, second position, or third position, and the third position is disposed between the first position and the second position.

In still another aspect of the invention, the mode selector is a slide type set at either a first position, second position, or third position, and the third position is disposed between the first position and the second position.

BRIEF DESCRIPTION OF THE DRAWINGS

FIG. 7 is a table showing the relationship between the press points on the area selector, and the AF selection area.

FIG. 10 is a table showing the relationship between the press point on the area selector, and the cursor movement direction during the cursor movement control of FIG. 9.

DETAILED DESCRIPTION OF THE PREFERRED EMBODIMENTS

The present invention provides a camera capable of selecting a focus detection area and setting the functions of the camera while viewing a display on the camera display device.

A specific focus detection area can be rapidly and easily selected by a user, to prevent the autofocus from improperly functioning. Hence, a mechanism to prevent inadvertent changing of the detection area is unnecessary.

Accordingly, the present invention relates to an operating mechanism capable of simply selecting one desired area by a user from among a plurality of focus detection areas, and prevents switching an area inadvertently selected against the intention of the user.

The camera of an embodiment of the present invention includes a multi-point focus detection device having a plurality of focus detection areas. The camera also includes a display device capable of displaying a plurality of information relating to the camera, and an area selector for controlling the ON/OFF state of switches arranged at least four locations vertically and horizontally.

In the first selection mode for selecting the focus detection area of the focus detection device, the area selector is used to select the focus detection area displayed on the display device. In the second selection mode for selecting the camera function settings, the area selector is used to select the setting item displayed on the display device. The operability is improved in a camera provided with multiple functions using this structure.

The camera of the embodiment also comprise a multipoint focus detection device having a plurality of focus detection areas, and a mode selector for selecting the focus detection mode. The mode selector is settable at three positions, including local position, wide position, and lock position.

When the mode selector is set at the local position, the local mode is set for selecting a single optional by the user from among a plurality of focus detection areas.

When the mode selector is set at the wide position, the wide mode is set for automatically selecting a single area by the camera from among a plurality of focus detection areas.

When the mode selector is set at the lock position, the focus detection area selected at the local position is locked when the mode selector is moved from the local position to the lock position, and the wide mode is locked when the mode selector is moved from the wide position to the lock position.

Inadvertent changing of the focus detection area and focus detection mode against the intention of the user can be prevented beforehand by providing this lock position.

Figure 1:
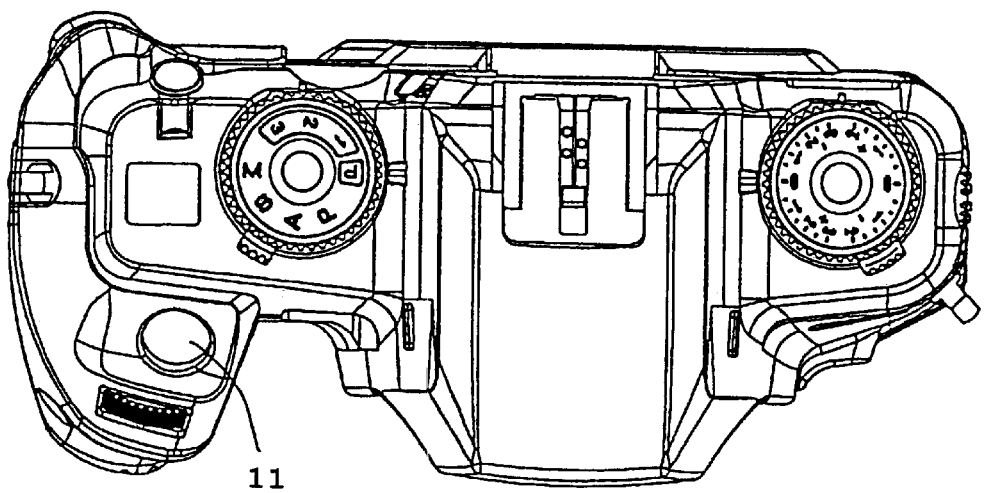
FIG. 1 is a top view of an embodiment of the camera of the present invention.
Figure 2:
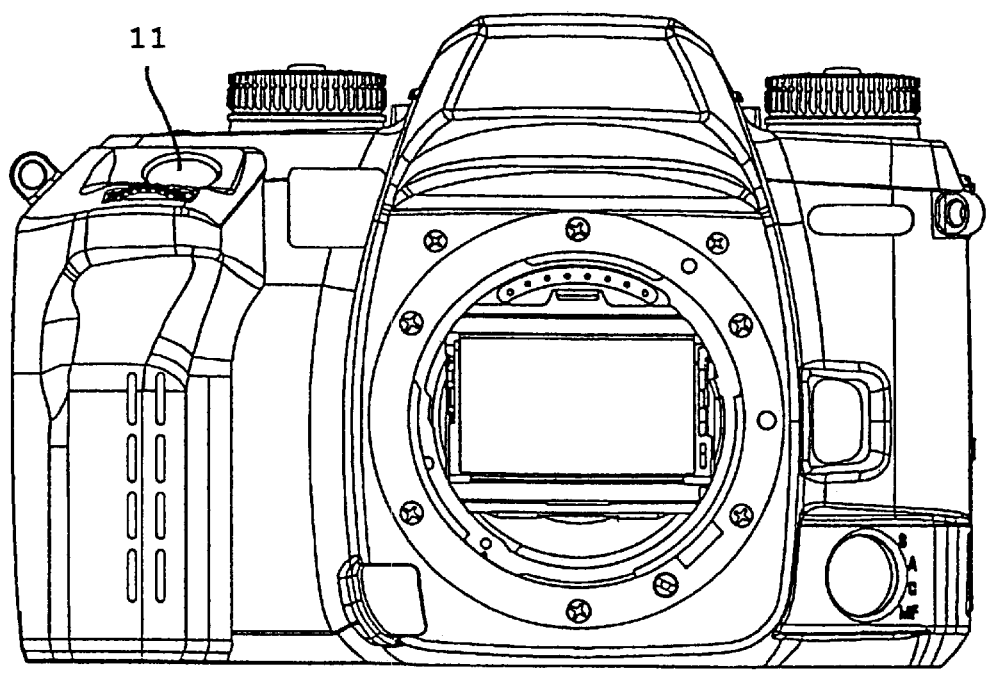
FIG. 2 is a plan view of the camera of FIG. 1.
Figure 3:
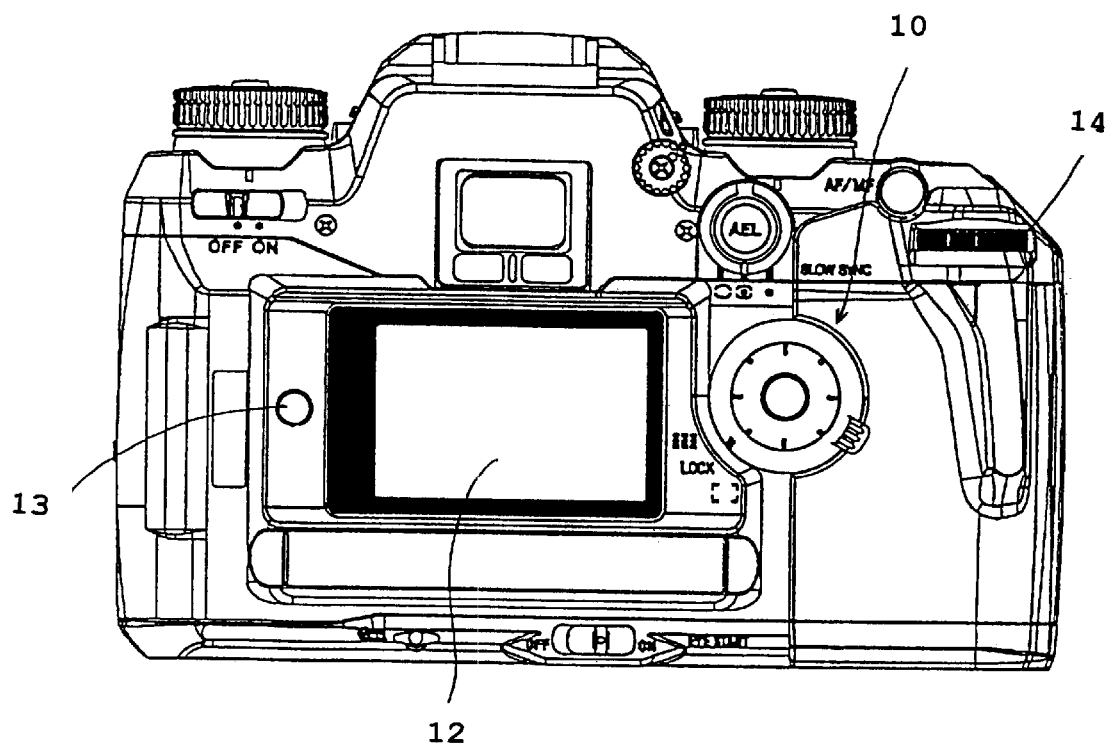
FIG. 3 is a back view of the camera of FIG. 1.

The embodiments of the present invention are described in detail hereinafter with reference to the accompanying drawings. FIGS. 1–3 are a top view, front view, and back view, respectively, of an embodiment of the camera of the present invention. The figures illustrate the positions of an operation part 10, shutter release button 11, LCD display device 12, custom setting button 13, and dial 14. The operation part 10 is used to control the ON/OFF state of the mode selection switch SW and the area selection switch SW described later.

Figure 4:
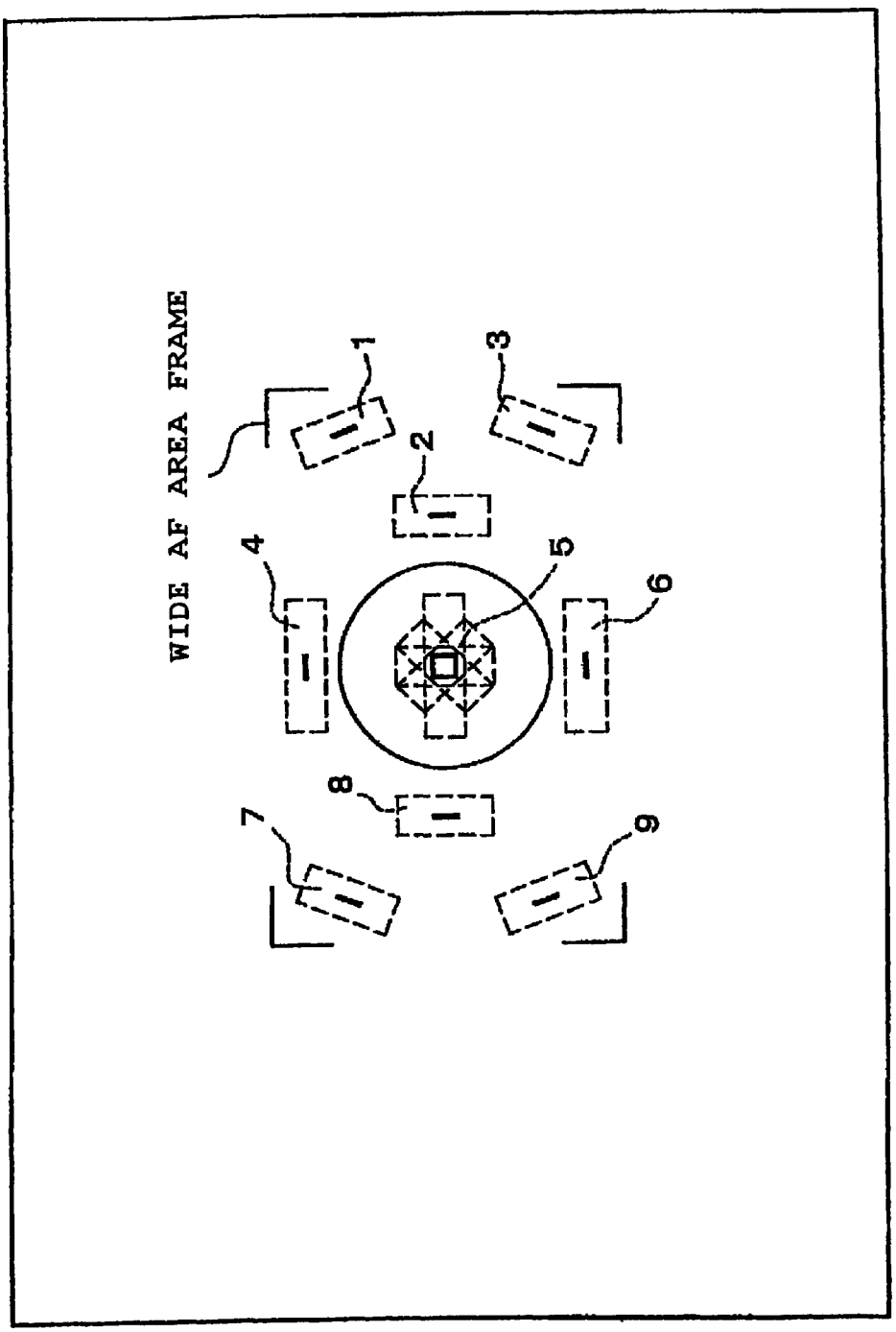
FIG. 4 illustrates the viewfinder view of the camera of FIG. 1.

FIG. 4 shows the viewfinder view. Nine individual focus detection areas are provided within a wide AF area frame. A user selects a specific focus detection area, and the camera automatically selects a detection area depending in the set mode.

Figure 5:
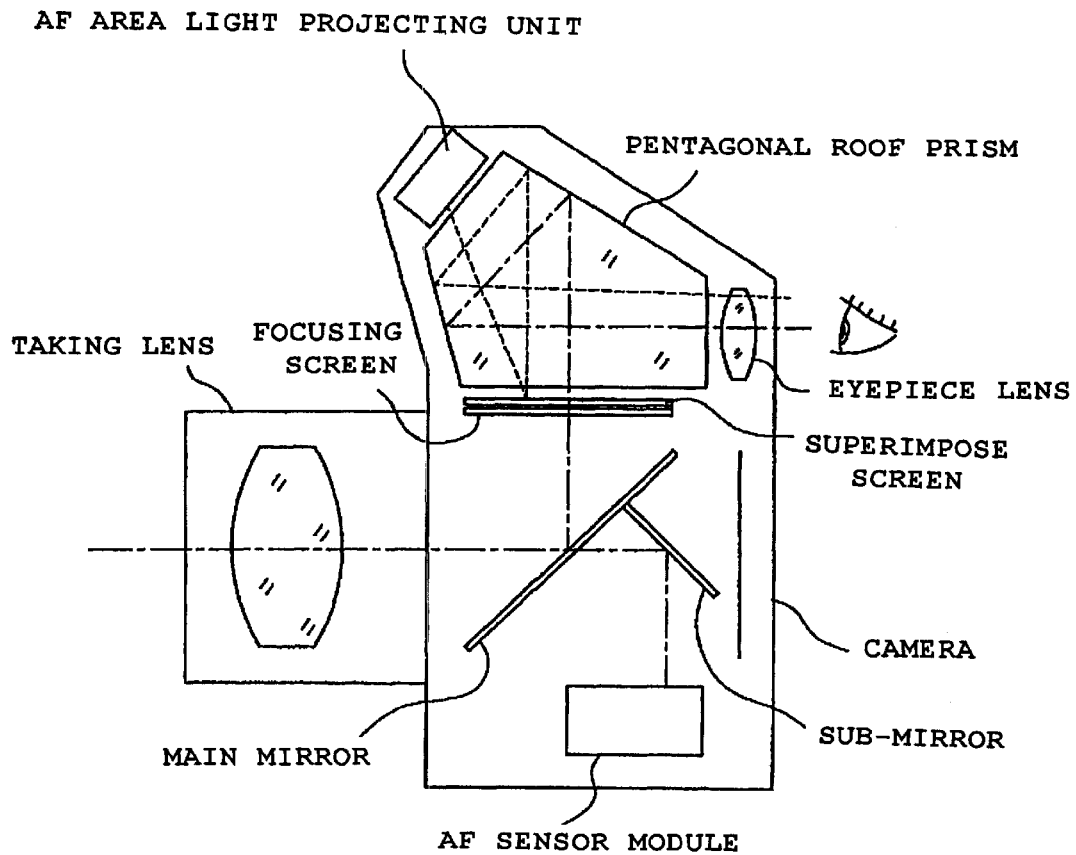
FIG. 5 is a cross section view of the camera of FIG. 1.

FIG. 5 is a cross section view of the of the camera. An AF area projection unit projects red colored light to a position on the superimpose (SI) screen coincide with the selected focus detection areas 1–9. The red light is reflected by the SI screen, and passes through a pentagonal roof prism so as to be viewable by a user. That is, when a user is looking through viewfinder, the thick line area within any selected focus detection area shown in FIG. 4 is displayed in red, such that the user can verify the selected area.

Figure 6:
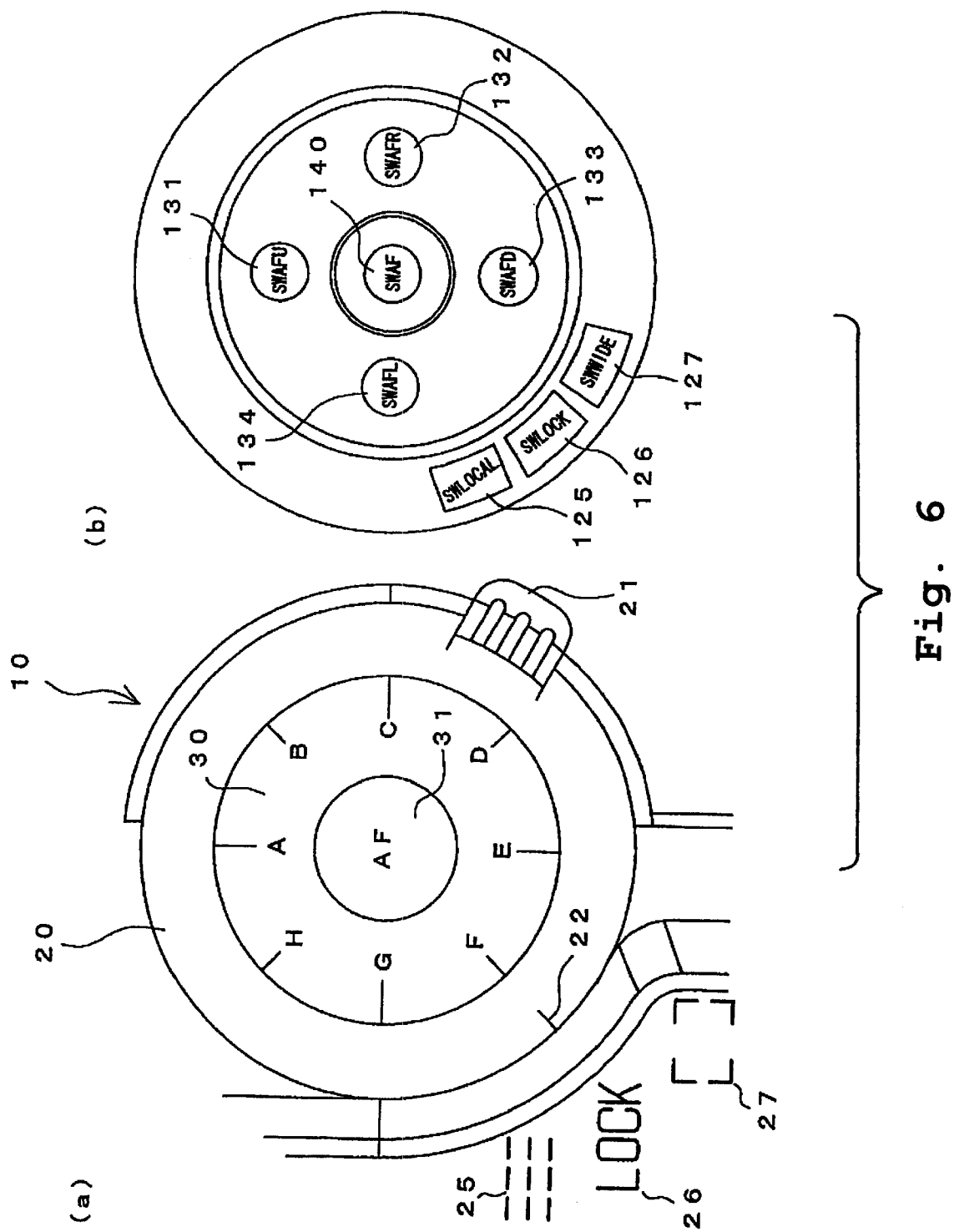
FIG. 6 is an enlargement of the operation part and the switch array below the operation part in FIG. 3.

FIG. 6(a) shows an enlargement of the operation part 10 shown in FIG. 3, and FIG. 6(b) shows the switches arrayed on the bottom side of the operation part 10. The operation part 10 comprises a mode selector 20 rotated by a lever 21, and an area selector 30 arranged on the interior side of the mode selector 20. The area selector 30 is provided with eight pressure operation points A–H arranged in a circle, and an AF button 31 provided in the center thereof.

In the mode selector 20, when the lever 21 is operated so as to match the pointer 22 with either the local mark 25, lock mark 26, or wide mark 27, one of the switches 125–127 is turned ON, and the various types of AF modes are set as described below.

When the mode selector 20 is set at the local position (i.e., the position corresponding to the local mark 25), the user himself can specify a focus detection area by operating the area selector 30 (local mode). When any of the pressure points A–H is pressed on the area selector 30, the corresponding UP switch SW 131, right switch SW 132, DOWN switch SW 133, or LEFT switch SW 134 is turned ON according to the correspondence relationship as shown in FIG. 7, and focus detection areas 1–4 and 6–9 are selected (refer to FIG. 4). When the AF button 31 is pressed, the AF switch SW 140 and the center focus detection area 5 is selected regardless of the ON/OFF state of other switches.

When the mode selector 20 is set at the wide position (i.e., a position corresponding to the wide mark 27), the wide mode is set wherein the camera automatically selects a focus detection area 1–9. For example, the camera may be preprogrammed to select a focus detection area so as to focus on the nearest object.

In the wide mode, when the user presses the AF button 31, the center area is forcibly selected irrespective of the auto-selected area, and the focusing is made based on the focus detection of the center area. After the completion of the focusing, when an in-focus condition is obtained, the focus condition is fixed.

Alternatively, when the user presses the area selector 30, the focusing is made based on the focus detection of the current auto-selected area. After the completion of the focusing, when an in-focus condition is obtained, the focus condition is fixed.

When the mode selector 20 is set at the lock position (i.e., the position corresponding to the lock mark 26), the control methods differ according to the two methods described below.

(1) When the mode selector 20 is moved from the local position to the lock position In this case the focus detection area specified by the user at the local position is locked. That is, when the shutter release button 11 is pressed half way (S1), an AF operation starts in this focus detection area.

(2) When the mode selector 20 is moved from the wide position to the lock position In this case the mode is locked in the wide mode.

In this case, the user cannot press the AF button 31 and the area selector 30, so that the focus detection area is determined automatically by the camera.

When the mode selector 20 is set at the lock position, the area selector 30 and the AF button 40 are mechanically locked and inoperable. Accordingly, the camera control state is locked in either state (1) or state (2) described above, effectively preventing the focus detection area to be inadvertently changed while the camera is operated by the user. Due to this control, the lock position is disposed medially to the local position and the wide position. Furthermore, although the mode selector 20 is rotated in the example in the drawing, a mode selector which is moved by sliding linearly may be used in place of this arrangement, and in this case the lock position will be disposed medially to the local position and the wide position.

The camera of the present embodiment is provided with a custom setting function, for example an AF priority/release priority (item number 1) during photography, an auto rewinding function YES/NO (item number 2), a film tip remaining/NOT during rewind (item number 3), or other custom items may be set as the user desires. The number and content custom setting items may be optionally determined by the manufacturer. Although the custom setting can be accomplished after the custom button 13 is pushed (refer to FIG. 3), the custom setting operation may be accomplished by combined use with the area selector 30 as a key for performing the custom setting operation.

Figure 8:
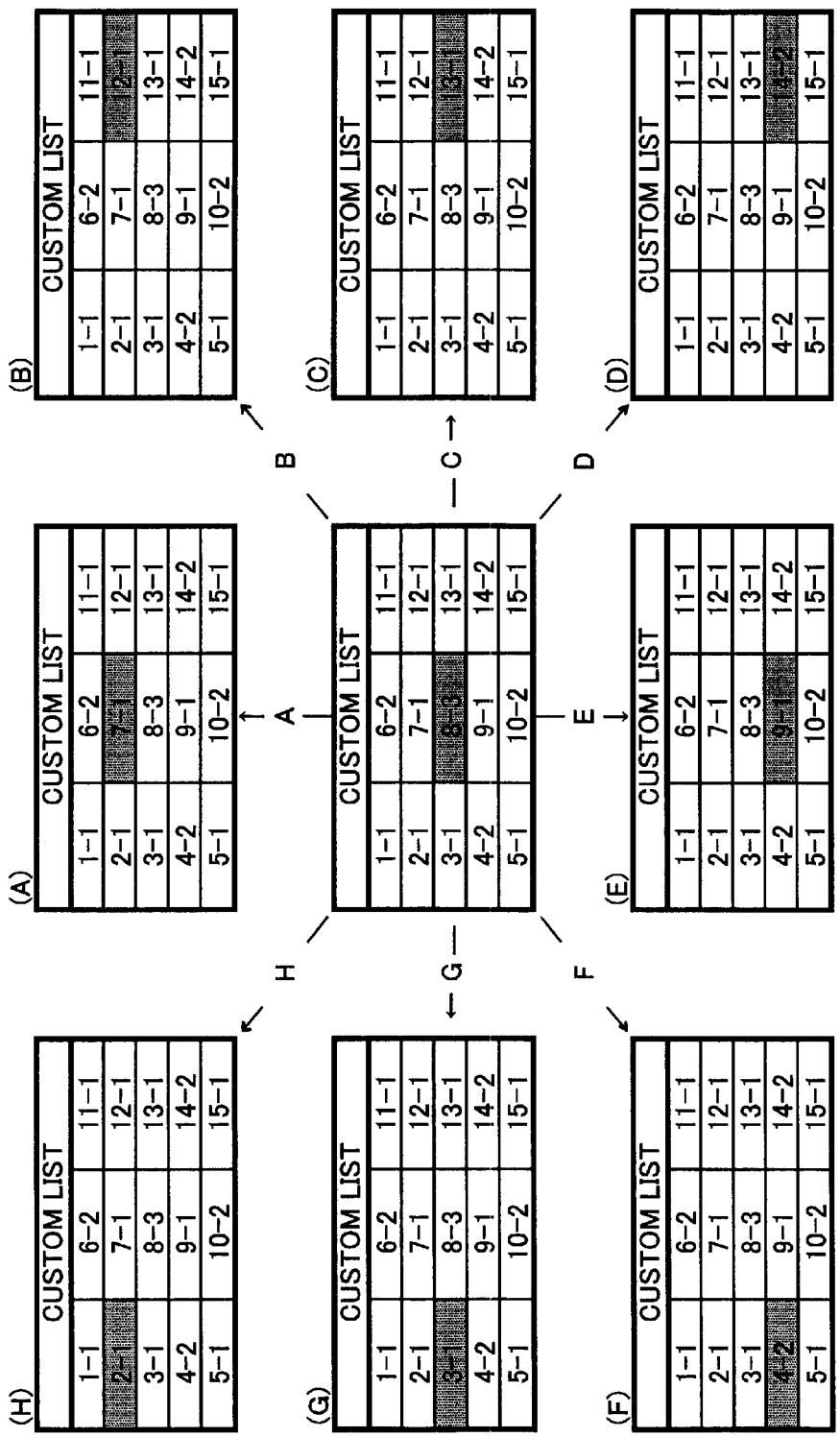
FIG. 8 illustrates the cursor movement when setting the custom setting.

The custom setting is described below with reference to FIG. 8. FIG. 8 shows an example of a display screen of the LCD display device 12 (refer to FIG. 3) when setting the custom function. When the current display screen is the center screen in FIG. 8 (i.e., the screen wherein the position [8-3] is shaded) and the A position of the area selector 30 is pushed, the shaded cursor slides upward as shown in display screen (A). Similarly, display screens (C)–(H) correspond to positions C–H. That is, the display of the shaded cursor can be moved vertically, horizontally, and diagonally by pushing A–H positions of the area selector 30.

Each custom item in the display is described below. For example, in the display box [1-1], the numeral 1 on the left side represents the item number, and the numeral 1 on the right side represents the setting content. As previously described, the area selector 30 is operated to move the shaded display position to the display box [1-1], and in this state the number on the right side can be changed by operating the dial 14 (refer to FIG. 3) (i.e., either [1-1] or [1-2] may be selected). If the display is [1-1], the custom setting sets AF priority, whereas when the display is [12], the custom setting sets release priority. Although the custom setting is started by pressing the custom button 13 in the example in the drawing, an AF selector button may be provided in place of the custom button 13. In this case, normally, the custom setting screen is displayed on the LCD display device 12, and the AF area selection mode switching and AF are selection are accomplished by pressing the AF selector button.

In the example shown in FIG. 8, the shaded display cursor can be moved diagonally by pressing each position B, D, F, H of the area selector 30 when setting the custom setting. When the shaded display cursor is moved diagonally, however, this oblique movement may cause discomfort depending on the user. Even when any of the positions A–H of the area selector 30 are pressed, the slide direction of the shaded display cursor may be only vertical or horizontal, and diagonal sliding may be prohibited.

Figure 9:
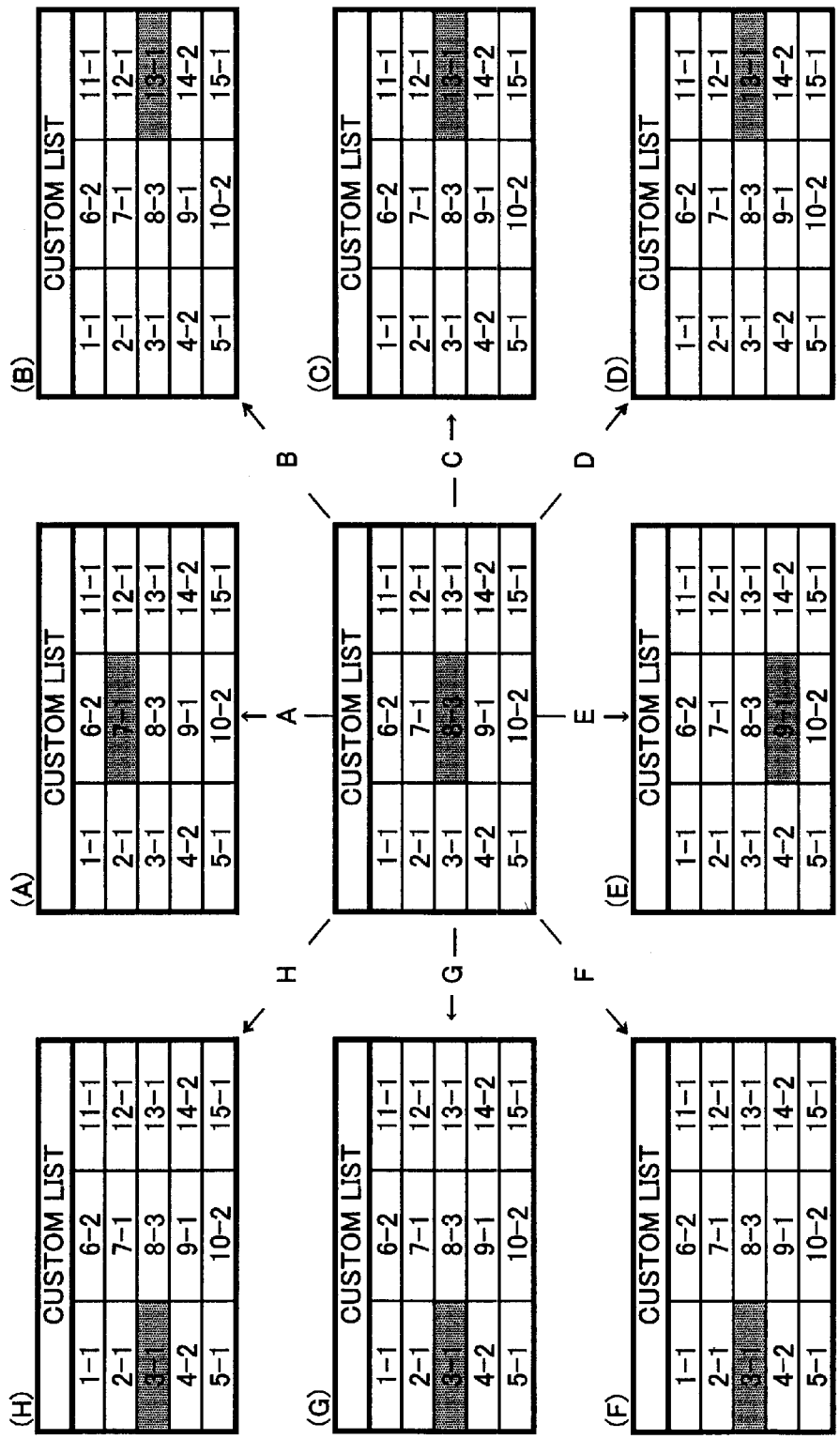
FIG. 9 shows another example of cursor movement.

FIG. 9 shows the relationship between the press point on the area selector 30 and the shaded display cursor slide direction when the previously described controls are executed. FIG. 10 is a table showing the relationships among the press point on the area selector 30, the turned ON switch, and the cursor movement direction in the aforesaid case. It can be understood that the cursor movement direction is different when the B position, D position, F position, and H position are pressed on the area selector 30, compared to FIG. 8. That is, when each of the positions B, D, F an H is pressed, the cursor is moved horizontally. Alternatively, the cursor may be moved vertically by the depression of these positions.

Figure 11:
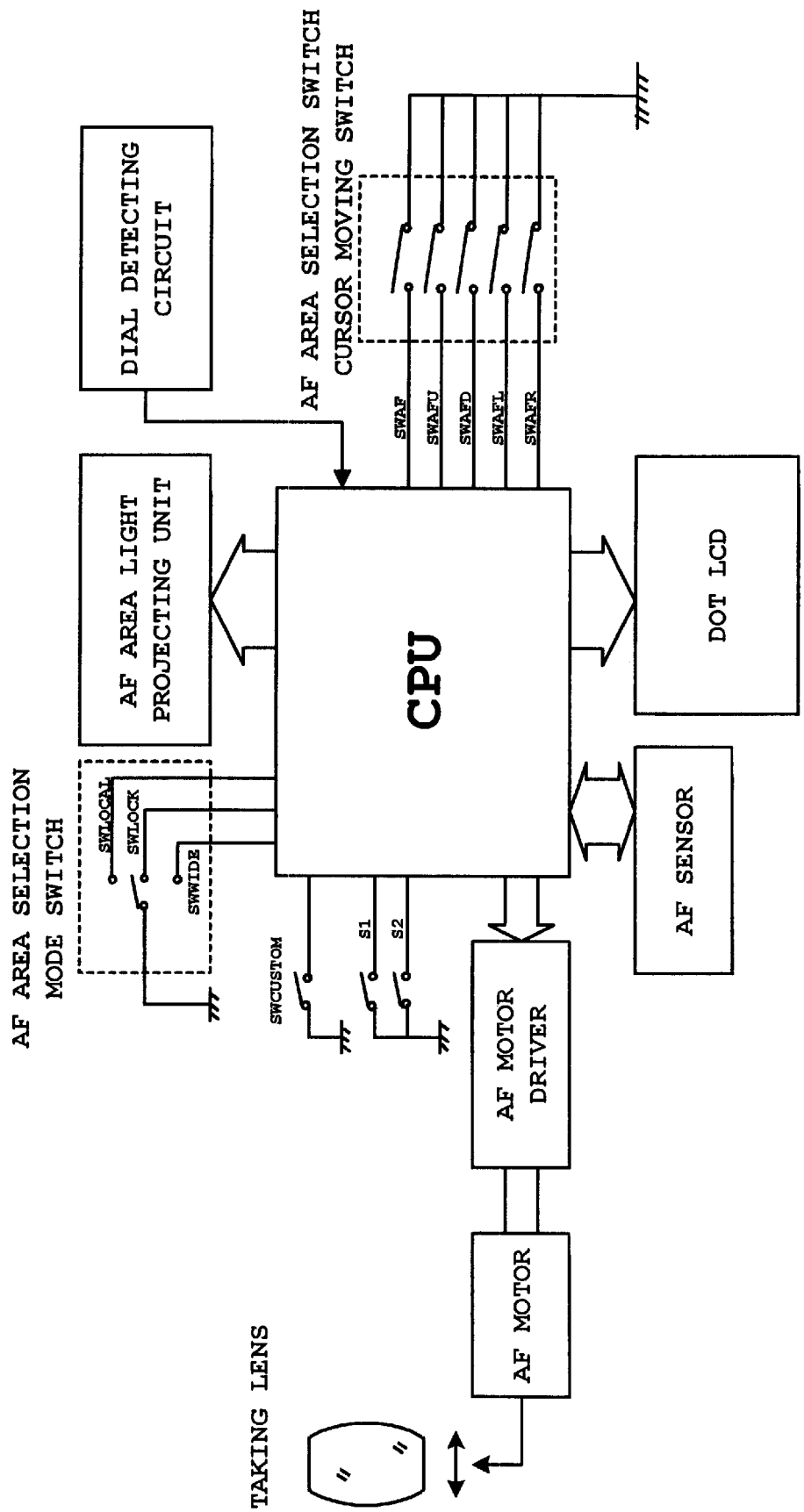
FIG. 11 is a control block diagram of the camera of FIG. 1.

FIG. 11 is another control block diagram of each switch in the aforesaid case.

Although the mode selector 20 is used for the operation to change the AF control mode in the embodiment described above, it is possible, alternatively, to use the mode selector 20 for the operation to change the other control modes such as, for example, photometric conditions and the like.

In this case a first position is provided in place of the wide position, for selecting an automatic setting mode for the camera to automatically set the photographic conditions. Furthermore, a second position is provided, in place of the wide position, for selecting a manual setting mode for the user to manually set the photographic conditions in place of the local position. In addition, a third position is provided medially to the first position and the second position, in place of the lock position.

The automatic setting mode is locked when the mode selector is set at the third position and the mode selector has moved from the first position to the third position, and the photographic conditions set at the second position are locked when the mode selector has moved from the second position to the third position.

In this case the mode selector may be a rotating type, or a slide type.

What is claimed is:

1. A camera, comprising:
    a multi-point focus detection device having a plurality of focus detection areas;
    a display device to display information relating to the camera; and
    an area selector to control an ON/OFF state of switches arranged at least at four locations,
    wherein the area selector is used to select one of the focus detection areas of the multi-point focus detection device, which area is displayed on the display device in a first selection mode, and is used to select setting items displayed on the display device in a second selection mode to select function settings of the camera.

2. The camera claimed in claim 1, wherein, in the first selection mode, one of the focus detection areas is selected which is positioned in an inclined direction relative to the currently selected focus detection area by simultaneously operating two adjacent area selectors among the four switches, and
    in the second selection mode, the setting item moves vertically or horizontally and movement in an inclined direction is prohibited when two adjacent area selectors are simultaneously operated among the four switches.

3. A camera, comprising:
    a multi-point focus detection device having a plurality of focus detection areas; and
    mode selectors to select the focus detection mode, wherein
    the mode selector has three position settings including a local position, wide position, and lock position, and
    when the mode selector is set at the local position, the local mode is set wherein one area is optionally user selectable from among the plurality of focus detection areas,
    when the mode selector is set at the wide position, the wide mode is selected wherein one area is automatically selected by the camera from among the plurality of focus detection areas, and
    when the mode selector is set at the lock position, the focus detection area selected at the local position is locked when the mode selector is moved from the local position to the lock position, and the wide mode is locked when the mode selector is moved from the wide position to the lock position.

4. The camera claimed in claim 3, wherein the mode selector is a rotary type set at either a local position, wide position, or lock position, and the lock position is between the local position and the wide position.

5. The camera claimed in claim 3, wherein the mode selector is a slide type set at either a local position, wide position, or lock position, and the lock position is between the local position and the wide position.

6. A camera having a mode selector settable at is three positions, comprising:
   a first position to select an automatic setting mode to automatically set the photographic conditions of the camera;
   a second position to select a manual setting mode for manually setting the photographic conditions of the camera; and
   a third position, wherein
   when the mode selector is set at the third position, the automatic setting is fixed when the mode selector is moved from the first position to the third position, and the photographic conditions set by the second position are fixed when the mode selector is moved from the second position to the third position.

7. The camera claimed in claim 6, wherein the mode selector is a rotary type set at either a first position, second position, or third position, and the third position is disposed between the first position and the second position.

8. The camera claimed in claim 6, wherein the mode selector is a slide type set at either a first position, second position, or third position, and the third position is disposed between the first position and the second position.

9. A camera, comprising: a multi-point focus detection device having a plurality of focus detection areas;
   a display device to display information relating to the camera; and
   an area selector-to control an ON/OFF state of switches arranged at least at four locations,
   wherein the area selector is used to select one of the focus detection areas of the multi-point focus detection device, which area is displayed on the display device in a first selection mode, and is used to select setting items displayed on the display device in a second selection mode to select function settings of the camera,
   in the first selection mode, one of the focus detection areas is selected which is positioned in an inclined direction relative to the currently selected focus detection area by simultaneously operating two adjacent area selectors among the four switches, and
   in the second selection mode, the setting item moves right or left and movement in an inclined direction is prohibited when two adjacent area selectors are simultaneously operated among the four switches.

10. A camera, comprising:
    a multi-point focus detection device having a plurality of focus detection areas;
    a display device to display information relating to the camera; and
    an area selector to control an ON/OFF state of switches for designating vertical, horizontal and inclined directions, wherein the area selector is used to select one of the focus detection areas of the multi-point focus detection device, which area is displayed on the display device in a first selection mode, and is used to select setting items displayed on the display device in a second selection mode to select function settings of the camera,
    in the first selection mode, one of the focus detection areas is selected which is positioned in an inclined direction relative to the currently selected focus detection area by designating inclined direction by the area selector, and
    in the second selection mode, the setting item moves vertically or horizontally and movement in an inclined direction is prohibited when the area selector designates the inclined direction.

* * * * *